(12) United States Patent
AlRebh et al.

(10) Patent No.: US 12,718,345 B2
(45) Date of Patent: Aug. 25, 2026

(54) METHODS AND SYSTEMS FOR MACHINE LEARNING-BASED ARTICLE CHECKING PROCESS

(71) Applicant: SAUDI ARABIAN OIL COMPANY, Dhahran (SA)

(72) Inventors: Mohammed Y. AlRebh, Al Iskan (SA); Jasim M. AlShihab, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 332 days.

(21) Appl. No.: 18/483,716

(22) Filed: Oct. 10, 2023

(65) Prior Publication Data

US 2025/0117916 A1 Apr. 10, 2025

(51) Int. Cl.

| | |
|---|---|
| ***G06T 7/00*** | (2017.01) |
| ***G06Q 10/087*** | (2023.01) |
| ***G06V 10/764*** | (2022.01) |

(52) U.S. Cl.
CPC ......... *G06T 7/0004* (2013.01); *G06Q 10/087* (2013.01); *G06V 10/764* (2022.01)

(58) Field of Classification Search
CPC .. G06T 7/0004; G06Q 10/087; G06V 10/764; G06V 10/82; G06V 20/52
See application file for complete search history.

(56) References Cited

U.S. PATENT DOCUMENTS

| | | | |
|---|---|---|---|
| 11,969,760 B1 * | 4/2024 | De La Rosa | B07C 5/16 |
| 2008/0137079 A1 | 6/2008 | Kreckel et al. | |
| 2015/0310533 A1 * | 10/2015 | Prabhu | G06Q 10/087 705/26.8 |
| 2023/0230017 A1 * | 7/2023 | Özyigit | G07B 17/00661 705/333 |
| 2025/0263190 A1 * | 8/2025 | Prasad | B65B 57/18 |

FOREIGN PATENT DOCUMENTS

| | | |
|---|---|---|
| EP | 0 803 903 A2 | 10/1997 |
| EP | 1 611 434 A1 | 1/2006 |

* cited by examiner

*Primary Examiner* — Xiao Liu
(74) *Attorney, Agent, or Firm* — Osha Bergman Watanabe & Burton LLP

(57) ABSTRACT

A method for automatically counting and identifying articles in a received consignment as well as, among other things, determining if the articles are damaged. The method includes obtaining an article identifier of a received consignment containing one or more articles and acquiring one or more images of the consignment with a device with a camera. The method further includes determining, with a first machine-learned model processing the one or more images, a class of each of the one or more articles forming a set of determined classes and determining a quantity for each class in the set of determined classes. The method further includes making a first determination of whether the article identifier matches the set of determined classes and the quantity of each class in the set of determined classes, and determining, with a second machine-learned model, whether a first article of the one or more articles is damaged.

20 Claims, 10 Drawing Sheets

METHODS AND SYSTEMS FOR MACHINE LEARNING-BASED ARTICLE CHECKING PROCESS

BACKGROUND

Procurement and Supply Chain Management operations or a Material Services Department oversee and are responsible for the reception of articles (e.g., items, products, goods) throughout one or more warehouses and/or logistic centers of an organization (e.g., a company, an industrial facility, etc.). Upon, or at, reception, received articles are checked by at least one employee to ensure that the received articles match an expected quantity and description, where the expected quantity and description may be established though a delivery note and/or purchase order. Additionally, in some instances, received articles are inspected for damage. The process of checking received articles by quantity and description, and further inspecting the received articles for damage, by at least one employee is inherently a manual, and often time-consuming and laborious, process subject to human error.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for automatically counting and identifying articles in a received consignment as well as, among other things, determining if the articles are damaged. The method includes obtaining an article identifier of a received consignment containing one or more articles and acquiring one or more images of the consignment with a device with a camera. The method further includes determining, with a first machine-learned model processing the one or more images, a class of each of the one or more articles forming a set of determined classes and determining a quantity for each class in the set of determined classes. The method further includes making a first determination of whether the article identifier matches the set of determined classes and the quantity of each class in the set of determined classes, determining, with a second machine-learned model, whether a first article of the one or more articles is damaged based on the determined class of the first article, and generating an alert based on a determination that the first article is damaged.

Embodiments disclosed herein generally relate to a non-transitory computer-readable memory with computer-executable instructions stored thereon that, when executed on a processor, cause the processor to perform the following steps. The steps include obtaining an article identifier of a received consignment comprising one or more articles and receiving one or more images of the consignment, the one or more images acquired with a device with a camera. The steps further include determining, with a first machine-learned model processing the one or more images, a class of each of the one or more articles forming a set of determined classes and determining a quantity for each class in the set of determined classes. The steps further include making a first determination of whether the article identifier matches the set of determined classes and the quantity of each class in the set of determined classes, determining, with a second machine-learned model, whether a first article of the one or more articles is damaged based on the determined class of the first article, and generating an alert based on a determination that the first article is damaged.

Embodiments disclosed herein generally relate to a system including a warehouse that receives a consignment comprising one or more articles, a camera, and a computer. The computer includes one or more computer processors and is configured to obtain an article identifier of the received consignment and receive one or more images of the consignment, the one or more images acquired with the camera. The computer is further configured to determine, with a first machine-learned model processing the one or more images, a class of each of the one or more articles forming a set of determined classes and determine a quantity for each class in the set of determined classes. The computer is further configured to make a first determination of whether the article identifier matches the set of determined classes and the quantity of each class in the set of determined classes. The computer is further configured to determine, with a second machine-learned model, whether a first article of the one or more articles is damaged based on the determined class of the first article and generate an alert based on a determination that the first article is damaged.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
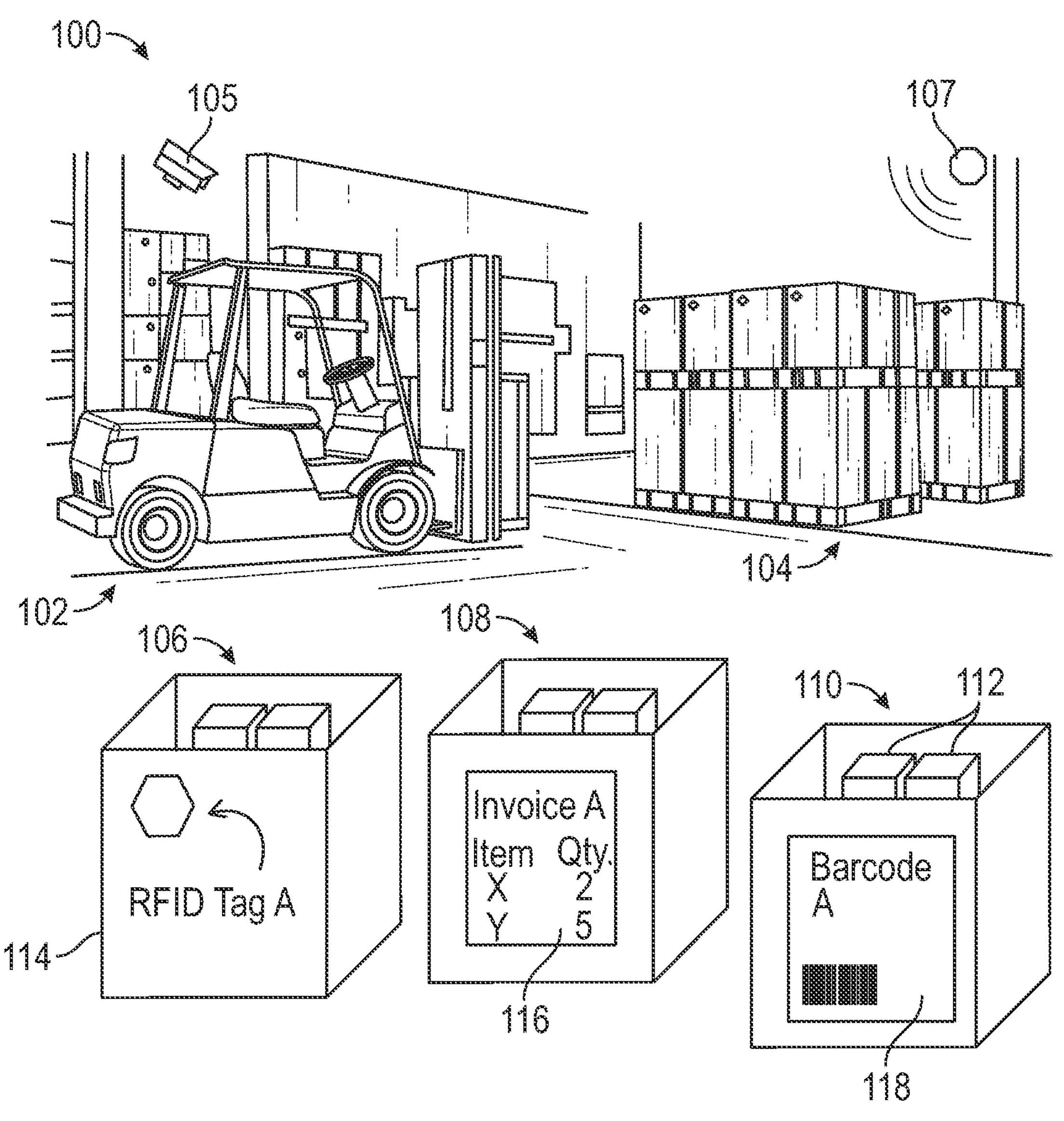
FIG. 1 depicts an example warehouse in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, a "consignment" may include any number of "consignments" without limitation.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-10, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein relate to a machine learning (ML)-based article checking system that determines a class of each article, such as an item, product, material, or good, in a received consignment. A consignment can include one or more packages or containers each containing at least one article. Further an article, or a batch of articles, can be considered a consignment even without a package or other containing object enclosing the article(s). Additionally, the ML-based article checking system determines the number, or the quantity, of each class of article in the received consignment and inspects each article for indications of damage. The determination of the class(es), quantity, and damage status of one or more articles contained in a consignment is performed by one or more machine-learned models that process, at least originally, one or more images of the consignment acquired using a camera. Specifically, the one or more images visually depict the contents (i.e., the articles) of the consignment (e.g., a package may need to be opened to acquire an image of the enclosed articles).

In one or more embodiments, the camera is included in a handheld device operated by a user (e.g., employee). In such embodiments, the user may direct the handheld device toward a received consignment, acquire one or more images of the one or more articles associated with the consignment, and automatically determined quantity, class, and damage information for the one or more articles.

In accordance with one or more embodiments, the ML-based article checking system further obtains an article identifier, such as a delivery note or associated purchase order, of the received consignment. The article identifier indicates the expected contents of the consignment. That is, the article identifier indicates, at least, an expected set of classes representative of the articles in the consignment and an expected quantity of each class in the expected set of classes. In one or more embodiments, the article identifier is obtained using the camera of the ML-based article checking system described herein, for example, by reading a barcode of a delivery note fixedly attached or otherwise associated with the received consignment. Consequently, the ML-based article checking system can compare the expected contents of the consignment, indicated by the article identifier, with the class and quantity information determined by the ML-based article checking system.

In one or more embodiments, the ML-based article checking system (e.g., including a handheld device with a camera) is interfaced with a procurement and supply chain management (P&SCM) system via a wireless connection. Wireless communication may be facilitated through RFID, NFC, low-energy Bluetooth, low-energy wireless, low-energy radio protocols, LTE-A, and WiFi-Direct technologies. The ML-based article checking system can update, automatically, an inventory of the P&SCM system with the determined class, quantity, and damage information. Further, the ML-based article checking system can generate an alert in the event of a discrepancy between the expected articles of the consignment and the determined classes and associated quantities of each class, or if an article is determined to be damaged. Additionally, in one or more embodiments, the ML-based article checking system can generate a goods receipt, where the goods receipt may trigger other processes of the P&SCM system such as updating the inventory with the articles of the received consignment, initiating a process to physically stock or transfer the articles of the consignment, and dispensing funds (e.g., approving and/or acting to realize an invoice or payment).

FIG. 1 depicts an example warehouse environment (100). The warehouse (100) is considered part of an organization (e.g., a company, an industrial facility, etc.) and is configured to, among other things, receive and process consignments (e.g., palleted packages (104)). Consignments may be moved into, throughout, and out of the warehouse (100) according to the processes of the warehouse (100) and the needs and purposes of the organization. Movement of consignments in the warehouse (100) may be facilitated by equipment such as a forklift (102).

The warehouse (100) can include a camera (e.g., Camera A (105)) to monitor and record, through the acquisition of one or more images, activities of the warehouse and the reception of one or more consignments. The warehouse can include a radio frequency identification (RFID) system composed of at least one reader (107) that obtains information from nearby RFID tags. The reader (107) is a device that has one or more antennas that emit radio waves and receive signals back from nearby RFID tags, if present. In general, an RFID tag may be affixed, or otherwise associated with, an item such as a consignment. The RFID tags use radio waves to communicate their identity and information related to their associated item (e.g., consignment). An RFID tag can be powered by its own battery source (i.e., an "active" RFID tag) or can be powered by the reader (107) (i.e., a "passive" RFID tag).

Consignments received and processed by the warehouse (100) can take a variety of forms and are not limited by those depicted in FIG. 1. In particular, FIG. 1 depicts three consignments, namely a first consignment (106), a second consignment (108), and a third consignment (110), each composed of a single package carrying one or more articles (e.g., example articles (112) within the package of the third consignment (110)). In general, an article can be any item, product, material, or good that may be received by the warehouse (100) in a consignment. Further, a consignment can include one or more packages or containers each containing at least one article. An article, or a batch of articles, can be considered a consignment even without a package or other containing object enclosing the article(s).

In accordance with one or more embodiments, a consignment will have an associated article identifier. The article identifier indicates the expected contents of the consignment. That is, the article identifier indicates, at least, an expected set of classes representative of the articles in the consignment and an expected quantity of each class in the expected set of classes. Article identifiers may include delivery notes, invoices, or any method for associating information with a consignment such as a RFID tag attached to, or contained within, a consignment. Article identifiers may further include barcodes, quick response (QR) codes, or other methods for encoding information, or at least encoding an identifier that may be looked up (e.g., in a database of purchase orders), that are associated with a consignment. For example, a barcode affixed to a consignment may be read by an appropriate reader such as a dedicated barcode scanner or the camera (e.g., Camera A (105)), where the barcode conveys information for looking up a purchase order associated with the consignment in an ordering system, the purchase order indicating (e.g., a tabular representation) the expected set of classes and the quantity of each class contained in the consignment.

FIG. 1 depicts several examples of article identifiers that may be used by the ML-based article checking system, in accordance with one or more embodiments. For example, the first consignment (106) is associated with an RFID tag (e.g., RFID Tag A (114)), the second consignment (108) has an attached invoice (e.g., Invoice A (116)), and the third consignment (110) has an imprinted barcode (e.g., Barcode A (118)). One with ordinary skill in the art will recognize that other article identifiers, not depicted in FIG. 1, may be used by the ML-based article checking system as described herein without departing from the scope of the instant disclosure. The ML-based article checking system obtains an article identifier from a consignment, the article identifier indicating, at least, a list of articles (i.e., class of article) and their quantity. As will be described in greater detail, the ML-based article checking system includes at least one camera (e.g., Camera A (105)). In one or more embodiments, the set of classes and the quantity of each class describing the articles of a consignment are determined using the at least one camera. For example, in one or more embodiments, the camera acquires an image of a consignment with an associated invoice (e.g., Invoice A (116)). The image is processed using computer vision techniques such as optical character recognition to convert the digital image to a machine-readable text format. Similarly, in one or more embodiments, the at least one camera of the ML-based article checking system acquires an image of a barcode (e.g., Barcode A (118)) that encodes information relating to the associated consignment. Encoded information may include a date of manufacturing, expiration date, name of the manufacturer, and the origin, price, and quantity of the articles of the consignment. In other embodiments, the barcode encodes an identifier that indexes a data entry in a database (e.g., a purchase order). In such cases, the set of classes and quantity of each class associated with a consignment are obtained by accessing, automatically (e.g., with a computing system like that of FIG. 10), the data entry indexed by the barcode identifier imaged with the ML-based article checking system.

Figure 2:
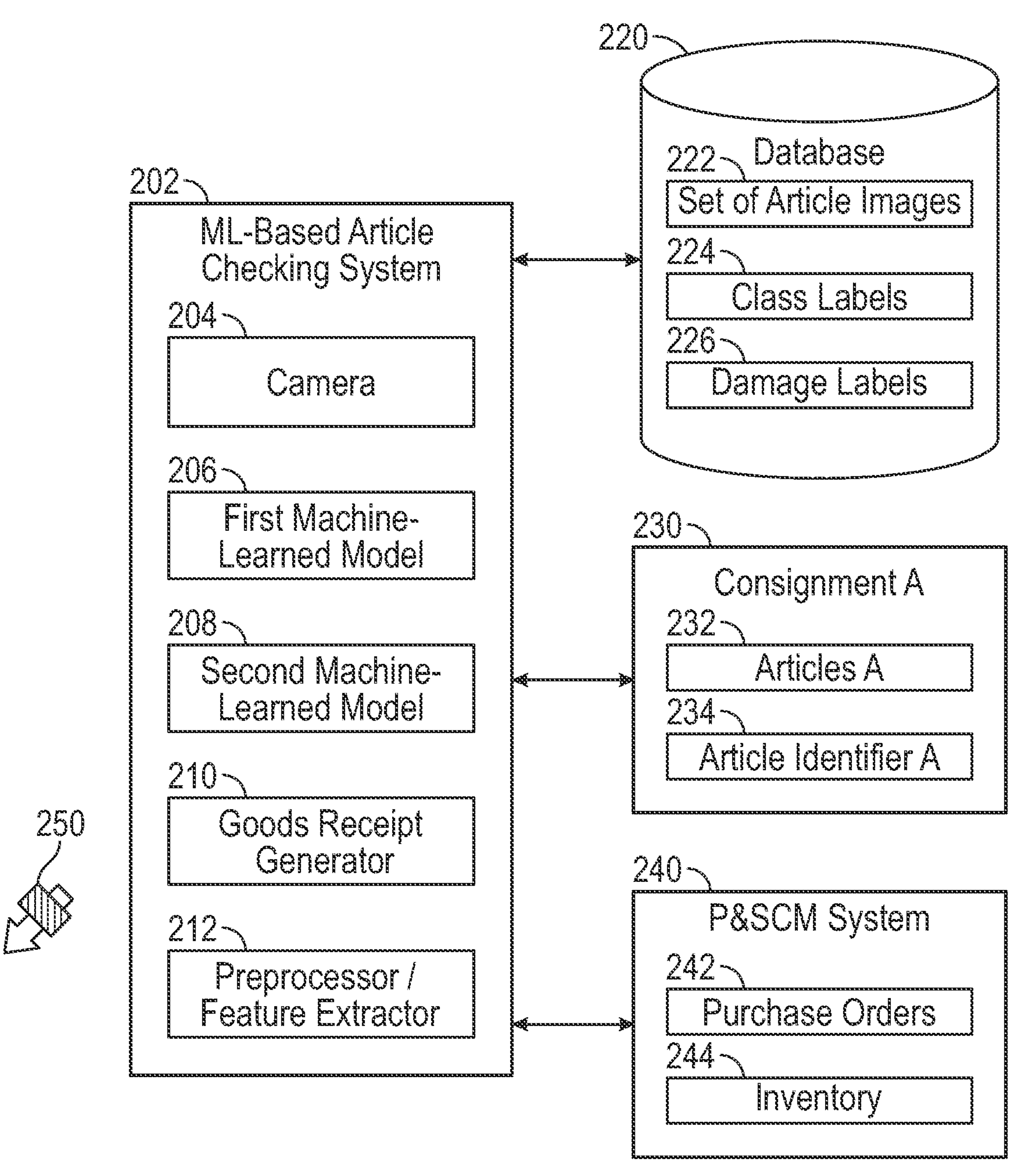
FIG. 2 depicts a block diagram in accordance with one or more embodiments.

FIG. 2 depicts the ML-based article checking system (202), in accordance with one or more embodiments. FIG. 2 depicts, as a block diagram, various components, modules, and/or subsystems, where the components, modules, and/or subsystems may interact with each other. For example, in FIG. 2, the ML-based article checking system (202) is shown to interact with a database (220) and a procurement and supply chain management (P&SCM) system. One with ordinary skill in the art will recognize that the partitioning, organization, and interaction of the components, modules, and/or subsystems of the ML-based article checking system (202), alongside interactions within said components, modules, and/or subsystems, in FIG. 2, is intended to promote clear discussion and should not be considered fixed or limiting. For example, FIG. 2 depicts the database (220) as an independent entity, however, in some embodiments, the database (220) may be encompassed by the ML-based article checking system (202).

In accordance with one or more embodiments, the ML-based article checking system (202) has access to (e.g., through inclusion), at least, a database (220). The database (220) stores digital media, such as data descriptive of one or more articles that may be received in a consignment. In one or more embodiments, the database (220) stores a set of article images (222) where each image is a pictorial depiction of an article. The set of article images (222) may be acquired and curated from a variety of sources, including images provided by a manufacturer of an article. In one or more embodiments, one or more article images in the set of article images (222) are obtained by scrapping webpages of a web domain (e.g., website or associated collection of websites) of a manufacturer.

In accordance with one or more embodiments, the database (220) includes class labels (224). Article images in the set of article images (222) may each be associated with a class label, the class label stored in class labels (224) of the database (220), and the class label identifying an article in the article image. For example, an article image may be an image of a valve in which case the class label associated with the article image is "valve." In instances where multiple types of an article exist, for example, valves of different sizes or construction, labels with greater specificity can be used.

In accordance with one or more embodiments, the database (220) includes damage labels (226). A given article may have more than one associate article image in the set of article images (222). Specifically, given an article, the set of article images (222) can contain images of the given article in a damaged and an undamaged state. As such, these article images in the set of article images (222) may each be associated with a damage label. The damage label indicates, at least, whether the article in the associated article image is damaged. In some embodiments, the damage label may further indicate a type of damage and the location (e.g., spatial location on the article) that the damage is present. For a given article, many article images with corresponding damage labels may exist and be stored in the database (220).

In accordance with one or more embodiments, the ML-based article checking system (202) is communicatively coupled to a procurement and supply chain management (P&SCM) system (or a materials service department). In general, P&SCM processes encompass the planning, organizing, executing, and monitoring of the acquisition, storage, transport, manipulation, and delivery of goods and services to meet the needs of an organization. P&SCM processes may be further categorized as procurement, inventory management, and distribution. Procurement activities include identifying suppliers and making offers to purchase goods or services. To this end, in one or more embodiments, the P&SCM system (240) includes a history or record of purchase orders (242), where a purchase order, broadly defined, is a contract between a buyer and a seller committing the buyer to purchase goods or services for a previously agreed upon price upon fulfillment (i.e., delivery of goods or completion of service action) of the goods or services. Inventory management includes, at least, keeping an accurate accounting of purchased, received, desired, and delivered articles. As such, the P&SCM system (240) may further include an inventory (244) where data such as quantity and location of each article managed by an organization is stored. Finally, distribution is the process of getting products from suppliers to customers.

In one or more embodiments, the ML-based article checking system (202), based on determinations made by the ML-based article checking system (202), can interact with and alter processes and data entries of the P&SCM system (240). For example, the ML-based article checking system (202) can access a purchase order in response to obtaining an article identifier of a consignment. Further, the ML-based article checking system (202) can update an alter inventory quantities and statuses in the inventory (244) of the P&SCM system (240) upon receipt of a consignment and subsequent checking of the consignment by the ML-based article checking system (202). For example, upon determining that a received consignment contains all the articles as expected given an article identifier of the received consignment, the ML-based article checking system (202) can interact and issue command signals to the P&SCM system (240) to initiate activities such as the transportation and stocking of the articles and issuing a payment to the supplier/seller.

As depicted in FIG. 2, the ML-based article checking system (202) includes at least one camera, hereafter referred to simply as a camera (204). In one or more embodiments, the camera (204) is disposed near a location where consignments are received by an organization, such as a warehouse. In other embodiments, the camera (204) is part of a handheld device operated by a user. The handheld device will be described in greater detail later in the instant disclosure. The camera (204), whether disposed on/in a structure (such as warehouse (100)) or in a handheld device, is used to acquire one or more images of a received consignment. FIG. 2 depicts an example consignment, namely, Consignment A (230) that contains articles (e.g., Articles A (232)) and has an article identifier (e.g., Article Identifier A (234)).

In accordance with one or more embodiments, the one or more images of the consignment acquired by the ML-based article checking system (202) are processed by a first machine learned model (206) and a second machine-learned model (208). Further, and as will be explained below, the one or more images may undergo various preprocessing and feature extraction steps, using a preprocessor and feature extractor (212), before, during, and/or after being processed by the first and second machine-learned models (206, 208).

In accordance with one or more embodiments, the first and second machine-learned models (206, 208) are applied to the at least one image acquired using the camera (204) to detect, identify, count, and determine a damage status of the articles of a received consignment (e.g., Articles A (232) of Consignment A (230)). As such, an output of the ML-based article checking system (202) is a determination of the set of classes (where a class describes and/or identifies an article), quantity of each class, and a count of how many articles of a class are damaged. In one or more embodiments, the ML-based article checking system (202) may further output an annotated version of the one or more images that labels articles of the consignment and indicates the location of damaged articles, if any. Finally, in one or more embodiments, the ML-based article checking system (202) may further output a goods receipt using a goods receipt generator (210). In one or more embodiments, the goods receipt generator (210) generates a document that may be physical (e.g., paper) or digital (e.g., an email) that confirms the receipt of articles to the organization employing the ML-based article checking system (202) from the suppler/seller. Further, the goods receipt generator (210) may trigger, for example through interaction with the P&SCM system (240), movement of the articles into a storage and/or logistics facility such as a warehouse.

As stated, the ML-based article checking system (202) includes a first machine-learned model (206) and a second machine-learned model (208). Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, random forests, and deep models such as neural networks, convolutional neural networks, and vision transformers. Machine-learned model types, whether they are considered deep or not, are usually associated with additional "hyper-parameters" which further describe the model. For example, hyperparameters providing further detail about a neural network may include, but are not limited to, the number of layers in the neural network, choice of activation functions, inclusion of batch normalization layers, and regularization strength.

Commonly, in the literature, the selection of hyperparameters surrounding a machine-learned model is referred to as selecting the model "architecture." Once a machine-learned model type and hyperparameters have been selected, the machine-learned model is trained to perform a task. In accordance with one or more embodiments, a machine-learned model type and associated architecture are selected, the first machine-learned model (206) is trained to detect and classify (i.e., assign a class) to instances of articles in one or more images of a consignment acquired using the camera (204). Further, in one or more embodiments, the second machine-learned model (208) is trained to, at least, classify an image of an article as damaged or undamaged. In some embodiments, the second machine-learned model (208) may further specify the type of damage and/or indicate the location of the damage on an article, if determined to be damaged. Once trained, the performance of the first and second machine-learned models (206, 208) may be evaluated (e.g., using a partition of training data not seen during training known as a "hold-out set" or "validation set" (or sometimes a "test set")) and these machine-learned models are used in a production setting (also known as deployment of the machine-learned models), where the production setting indicates the use of the machine-learned models by the ML-based article checking system (202).

As noted, the objective of the first machine-learned model (206) is to detect and classify instances of articles. Detection indicates the location of an article in an image. The location of an article may be indicated using a bounding box that circumscribes the portion of the image containing the article or the location of an article may be indicated pixelwise, where each pixel which is found to be associated with an article is flagged or given an identifier (i.e., instance segmentation). Detected articles are also classified by the first machine-learned model (206). For each detected article, a class probability distribution is returned. The class probability distribution indicates the probability that an object belongs to each class in a given set of classes (e.g., class labels (224)). For example, a set of classes may include the classes {'bolt', 'valve', 'bracket', 'mount', 'pipe', 'elbow', 'seal', etc.}. Thus, the first machine-learned model (206) returns, at least, the location and class distribution of detected articles in an image.

Many machine-learned model architectures are described in the literature for the task of object detection and identification. These machine-learned models are usually based on one or more convolutional neural networks. For example, regional based CNNs (R-CNNs) and single shot detectors (SSDs) (and their variants) are commonly employed architectures. Any of these architectures, or others not explicitly referenced herein, may be used by the first machine-learned model (206) of the ML-based article checking system (202) without departing from the scope of the instant disclosure. In accordance with one or more embodiments, the first machine-learned model (206) is trained using the set of article images (222) and associated class labels (224) of the database (220).

In accordance with one or more embodiments, the first machine-learned model (206) used in the ML-based article checking system (202) disclosed herein is a convolutional neural network (CNN). In particular, in one or more embodiments, the architecture of the CNN is based, or is, the You Only Look Once (YOLO) object detection model. It is noted that various versions of YOLO exist and differ in such things as the types of layers used, resolution of training data, etc. However, a defining trait of all YOLO versions is that multiple objects of varied scales can be detected in a single pass. Further, recent YOLO architectures partition a received input image into grid cells and the grid cells each have one or more associated anchor boxes. In one or more embodiments, the first machine-learned model (206) follows the same structure of layers as YOLOv4.

A CNN, such a YOLO, may be more readily understood as a specialized neural network (NN). Thus, a cursory introduction to a NN and a CNN are provided herein. However, it is noted that many variations of a NN and CNN exist. Therefore, one with ordinary skill in the art will recognize that any variation of the NN or CNN (or any other machine-learned model) may be employed without departing from the scope of this disclosure. Further, it is emphasized that the following discussions of a NN and a CNN are basic summaries and should not be considered limiting.

Figure 3:
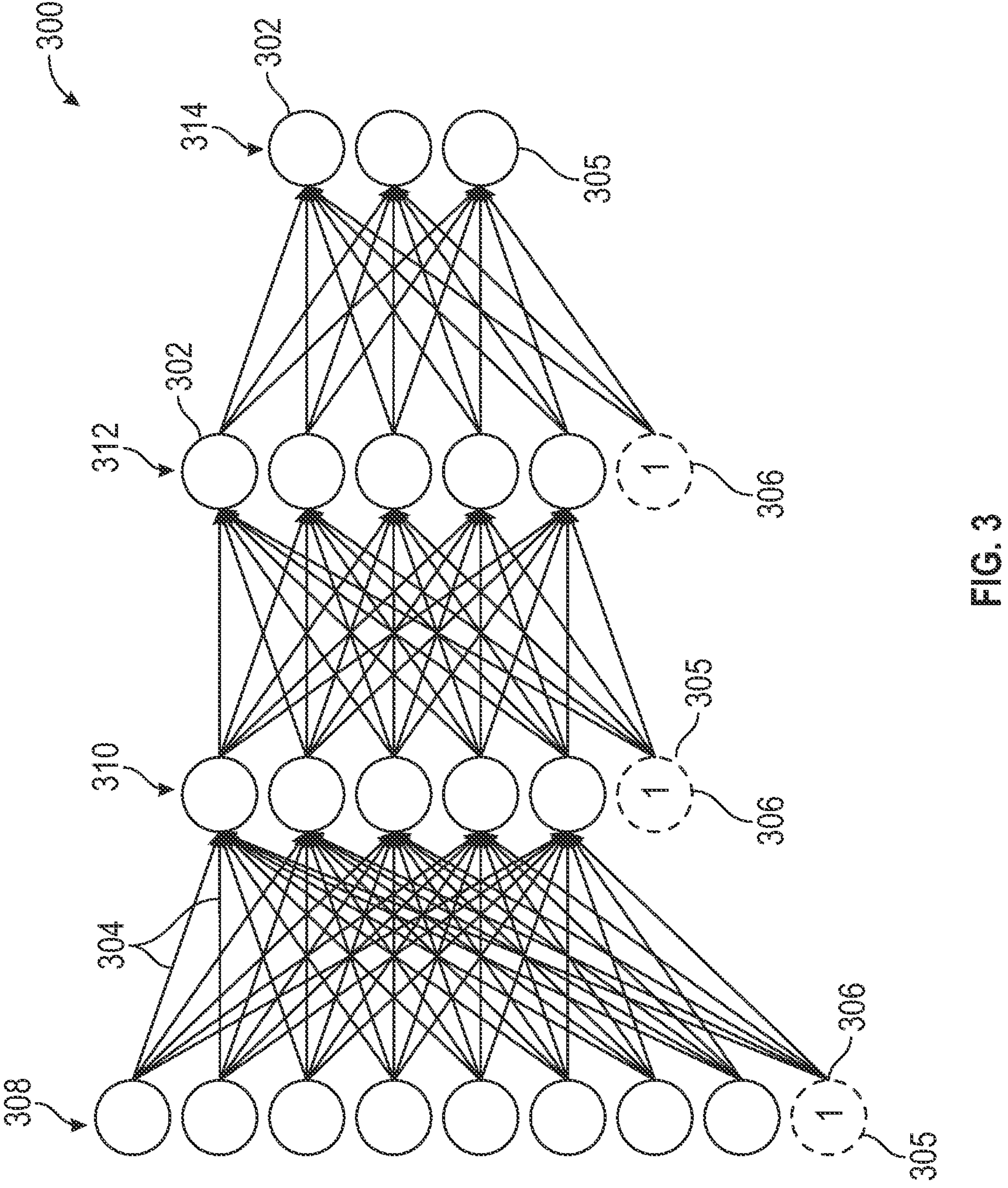
FIG. 3 depicts a neural network in accordance with one or more embodiments.

A diagram of a neural network is shown in FIG. 3. At a high level, a neural network (300) may be graphically depicted as being composed of nodes (302), where here any circle represents a node, and edges (304), shown here as directed lines. The nodes (302) may be grouped to form layers (305). FIG. 3 displays four layers (308, 310, 312, 314) of nodes (302) where the nodes (302) are grouped into columns, however, the grouping need not be as shown in FIG. 3. The edges (304) connect the nodes (302). Edges (304) may connect, or not connect, to any node(s) (302) regardless of which layer (305) the node(s) (302) is in. That is, the nodes (302) may be sparsely and residually connected. A neural network (300) will have at least two layers (305), where the first layer (308) is considered the "input layer" and the last layer (314) is the "output layer". Any intermediate layer (310, 312) is usually described as a "hidden layer". A neural network (300) may have zero or more hidden layers (310, 312) and a neural network (300) with at least one hidden layer (310, 312) may be described as a "deep" neural network or as a "deep learning method". In general, a neural network (300) may have more than one node (302) in the output layer (314). In this case the neural network (300) may be referred to as a "multi-target" or "multi-output" network.

Nodes (302) and edges (304) carry additional associations. Namely, every edge is associated with a numerical value. The edge numerical values, or even the edges (304) themselves, are often referred to as "weights" or "parameters". While training a neural network (300), numerical values are assigned to each edge (304). Additionally, every node (302) is associated with a numerical variable and an activation function. Activation functions are not limited to any functional class, but traditionally follow the form $$A = f\left(\sum_{i \in (incoming)} [(\text{node value})_i (\text{edge value})_i]\right), \tag{EQ 1}$$

where i is an index that spans the set of "incoming" nodes (302) and edges (304) and f is a user-defined function. Incoming nodes (302) are those that, when viewed as a graph (as in FIG. 3), have directed arrows that point to the node (302) where the numerical value is being computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node (302) in a neural network (300) may have a different associated activation function. Often, as a shorthand, activation functions are described by the function $f$ by which it is composed. That is, an activation function composed of a linear function $f$ may simply be referred to as a linear activation function without undue ambiguity.

When the neural network (300) receives an input, the input is propagated through the network according to the activation functions and incoming node (302) values and edge (304) values to compute a value for each node (302). That is, the numerical value for each node (302) may change for each received input. Occasionally, nodes (302) are assigned fixed numerical values, such as the value of 1, that are not affected by the input or altered according to edge (304) values and activation functions. Fixed nodes (302) are often referred to as "biases" or "bias nodes" (306), displayed in FIG. 3 with a dashed circle.

In some implementations, the neural network (300) may contain specialized layers (305), such as a normalization layer, or additional connection procedures, like concatenation. One skilled in the art will appreciate that these alterations do not exceed the scope of this disclosure.

As noted, the training procedure for the neural network (300) comprises assigning values to the edges (304). To begin training the edges (304) are assigned initial values. These values may be assigned randomly, assigned according to a prescribed distribution, assigned manually, or by some other assignment mechanism. Once edge (304) values have been initialized, the neural network (300) may act as a function, such that it may receive inputs and produce an output. As such, at least one input is propagated through the neural network (300) to produce an output. Training data is provided to the neural network (300). Generally, training data consists of pairs of inputs and associated targets. The targets represent the "ground truth", or the otherwise desired output, upon processing the inputs. In the context of the instant disclosure, an input is an image of a consignment depicting at least one article of the consignment and its associated target is a data structure indicating the location (e.g., bounding box) and class (i.e., class label) of each article of the at least one article depicted in the image.

During training, the neural network (300) processes at least one input from the training data and produces at least one output. Each neural network (300) output is compared to its associated input data target. The comparison of the neural network (300) output to the target is typically performed by a so-called "loss function"; although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (300) output and the associated target. The loss function may also be constructed to impose additional constraints on the values assumed by the edges (304), for example, by adding a penalty term, which may be physics-based, or a regularization term (not be confused with regularization of seismic data). Generally, the goal of a training procedure is to alter the edge (304) values to promote similarity between the neural network (300) output and associated target over the training data. Thus, the loss function is used to guide changes made to the edge (304) values, typically through a process called "backpropagation."

While a full review of the backpropagation process exceeds the scope of this disclosure, a brief summary is provided. Backpropagation consists of computing the gradient of the loss function over the edge (304) values. The gradient indicates the direction of change in the edge (304) values that results in the greatest change to the loss function. Because the gradient is local to the current edge (304) values, the edge (304) values are typically updated by a "step" in the direction indicated by the gradient. The step size is often referred to as the "learning rate" and need not remain fixed during the training process. Additionally, the step size and direction may be informed by previously seen edge (304) values or previously computed gradients. Such methods for determining the step direction are usually referred to as "momentum" based methods.

Once the edge (304) values have been updated, or altered from their initial values, through a backpropagation step, the neural network (300) will likely produce different outputs. Thus, the procedure of propagating at least one input through the neural network (300), comparing the neural network (300) output with the associated target with a loss function, computing the gradient of the loss function with respect to the edge (304) values, and updating the edge (304) values with a step guided by the gradient, is repeated until a termination criterion is reached. Common termination criteria are: reaching a fixed number of edge (304) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (304) values are no longer intended to be altered, the neural network (300) is said to be "trained."

A CNN is similar to a neural network (300) in that it can technically be graphically represented by a series of edges (304) and nodes (302) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Images have such a structural relationship. Consequently, a CNN is an intuitive choice for detecting articles in an image of a consignment.

A structural grouping, or group, of weights is herein referred to as a "filter". The number of weights in a filter is typically much less than the number of inputs, where here the number of inputs refers to the number of pixels in an image or the number of trace-time (or trace-depth) values in a seismic dataset. In a CNN, the filters can be thought as "sliding" over, or convolving with, the inputs to form an intermediate output or intermediate representation of the inputs which still possesses a structural relationship. Like unto the neural network (300), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening". The flattened representation may be passed to a neural network (300) to produce a final output. Note, that in this context, the neural network (300) is still considered part of the CNN. Like unto a neural network (300), a CNN is trained, after initialization of the filter weights, and the edge (304) values of the internal neural network (300), if present, with the backpropagation process in accordance with a loss function.

Returning to FIG. 2, and as previously stated, the first machine-learned model (206) processes at least one image of a consignment depicting the articles of the consignment using the camera (204) of the ML-based article checking system (202) and detects (i.e., locates in the at least one image and classifies) the articles of the consignment. With the articles detected by the first machine-learned model (206), in one or more embodiments, the ML-based article checking system (202) tabulates the results of the detection. That is, the ML-based article checking system (202) determines a set of classes corresponding to the detected articles and counts the number of articles in each class. As such, the ML-based article checking system (202) determines both a set of classes and a quantity of each class contained in the consignment. In one or more embodiments, the image processed by the first machine-learned model (206) is partitioned, by the ML-based article checking system (202), into one or more isolated article images where each isolated article image depicts a single instance of an article of the consignment. For example, if the first machine-learned model (206) detects three valves, then three distinct isolated article images are created from the image corresponding to the three instances of valves. In accordance with one or more embodiments, the second machine-learned model (208) receives an isolated article image, or a featurized representation of an isolated article image, along with the determined class of the article depicted in the isolated article image and determines whether the depicted article is damaged.

Based on the detection of the first machine-learned model (206), the ML-based article checking system (202) constructs an isolated article image for each detected article. In one or more embodiments, each isolated article image is processed with the preprocessor and feature extractor (212) of the ML-based article checking system (202) to produce a featurized representation of the article in the isolated article image. The featurized representation may include information such as the color, shape, size, and texture of the article in a given isolated article image. Feature extraction may further use methods like edge detection to simplify the isolated article image and principal components analysis (PCA) to reduce the dimensionality and encode the information of the isolated article image. In these embodiments, the second machine-learned model (208) processes the featurized representation to determine whether the associated article is damaged. Similar to the first machine-learned model (206), the second machine-learned model may be a CNN or a composition of various ML model types such as a CNN followed by a support vector machine (SVM). In accordance with one or more embodiments, the second machine-learned model (208) is trained using featurized representations of each article image in the set of article images (222) and associated damage labels (226) of the database (220).

In other embodiments, isolated article images are not processed using the preprocessor and feature extractor (212) of the ML-based article checking system (202) but are directly processed using the second machine-learned model (208). In these embodiments, the second machine-learned model (208) is trained using the set of article images (without featurization) (222) and associated damage labels (226) of the database (220).

In accordance with one or more embodiments, the ML-based article checking system (202) can issue a command or control signal (e.g., Command Y (250)) to an external system or process. For example, the control signal may indicate that an update to the inventory (244) should be made and that a goods receipt should be generated. Additionally, the control signal may generate an alarm or notification to a user that one or more detected items have been determined by the ML-based article checking system (202) to be damaged. In one or more embodiments, the control signal dictates whether articles of the received consignment (possibly on an article-by-article basis) should be received by the organization and appropriately stocked or shipped, discarded, or returned to the supplier/seller. In one or more embodiments, stocking and transportation of articles is performed by an autonomous system including at least one storage and transportation robot. As such, the control signal (e.g., Command Y (250)) can control and direct a storage and transportation robot to move one or more articles of a received consignment based on the result of the ML-based article detection system (202).

Figure 4:
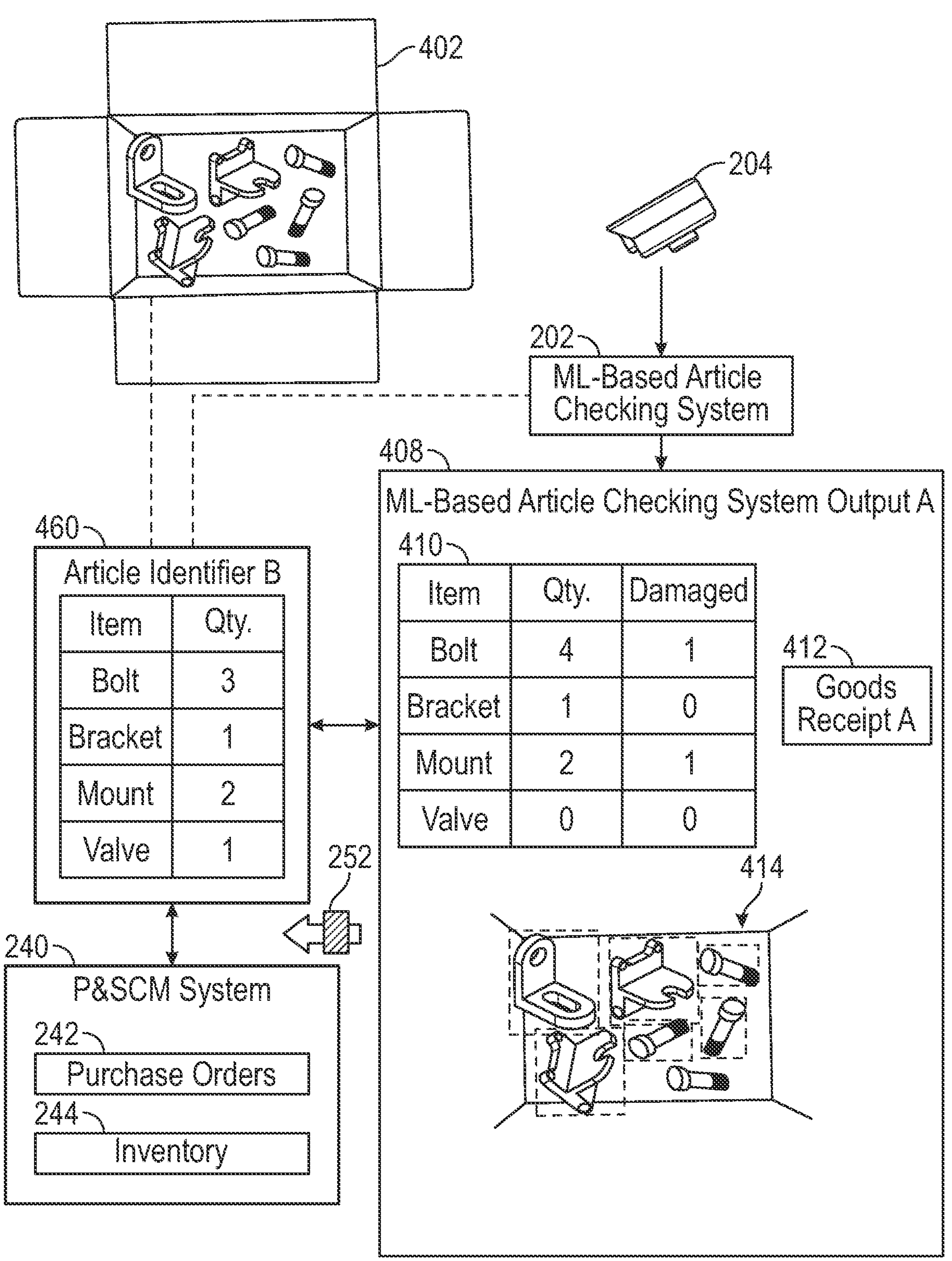
FIG. 4 depicts a system in accordance with one or more embodiments.

FIG. 4 depicts simplified example use case and output of the ML-based article checking system (202), in accordance with one or more embodiments. As seen, FIG. 4 depicts a consignment, namely, Consignment B (402) with various articles. Consignment B (402) has an associated article identifier, namely, Article Identifier B (460) that indicates the expected articles (i.e., set of classes) and expected quantity of each article. The ML-based article checking system (202) obtains Article Identifier B (460) (e.g., using the camera (204) to read a barcode and interfacing with the P&SCM system (240) to access the appropriate purchase order from purchase orders (242)). Using the camera (204), the ML-based article checking system (310) acquires an image of Consignment B (402). The ML-based article checking system (202) processes the acquired image, using at least the first and second machine-learned models (206, 208), and produces an output such as ML-based article checking system Output A (408).

As seen, Output A (408) includes a tabulated result (e.g., Tabulated Result A (410)) that lists the classes of the detected articles, the quantity of each class, and the quantity of articles in each class that are damaged. Further, Output A (408) includes a detection result (e.g., Detection Result A (414)) that illustrates, through the use of bounding boxes, each instance of the detected articles. The detection result (414) may further annotate the location, in the consignment, of the articles determined to be damaged such as the mount with a crack and the bolt with a scored thread depicted in the example of FIG. 4. In one or more embodiments, the ML-based article checking system (202) checks the tabulated result (e.g., Tabulated Result A (410)) with the article identifier (e.g., Article Identifier B (460)) of the consignment for discrepancies such as incongruent expected articles classes and quantities. Based on the check, the ML-based article checking system (202) may issue a command (e.g., Command Z (252)) or alert (e.g., to notify a user) of the presence and quantity of damaged articles and/or generate a goods receipt (e.g., Goods Receipt A (412)).

Figure 5:
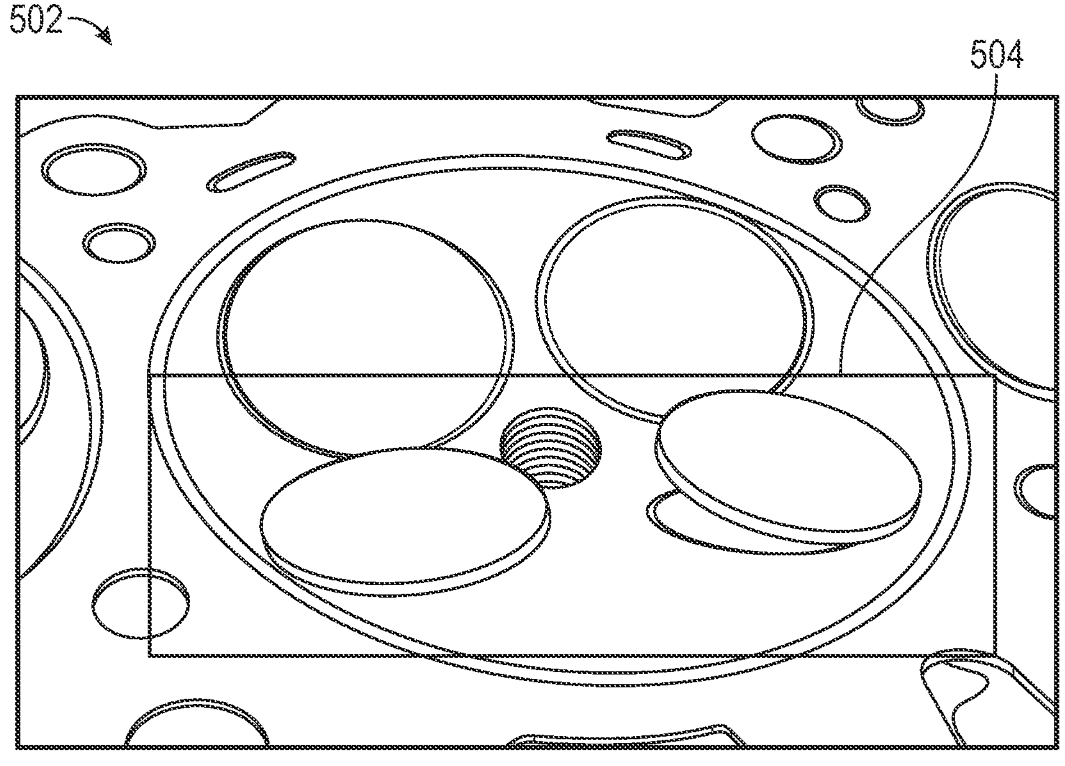
FIG. 5 depicts a damaged article in accordance with one or more embodiments.
Figure 6:
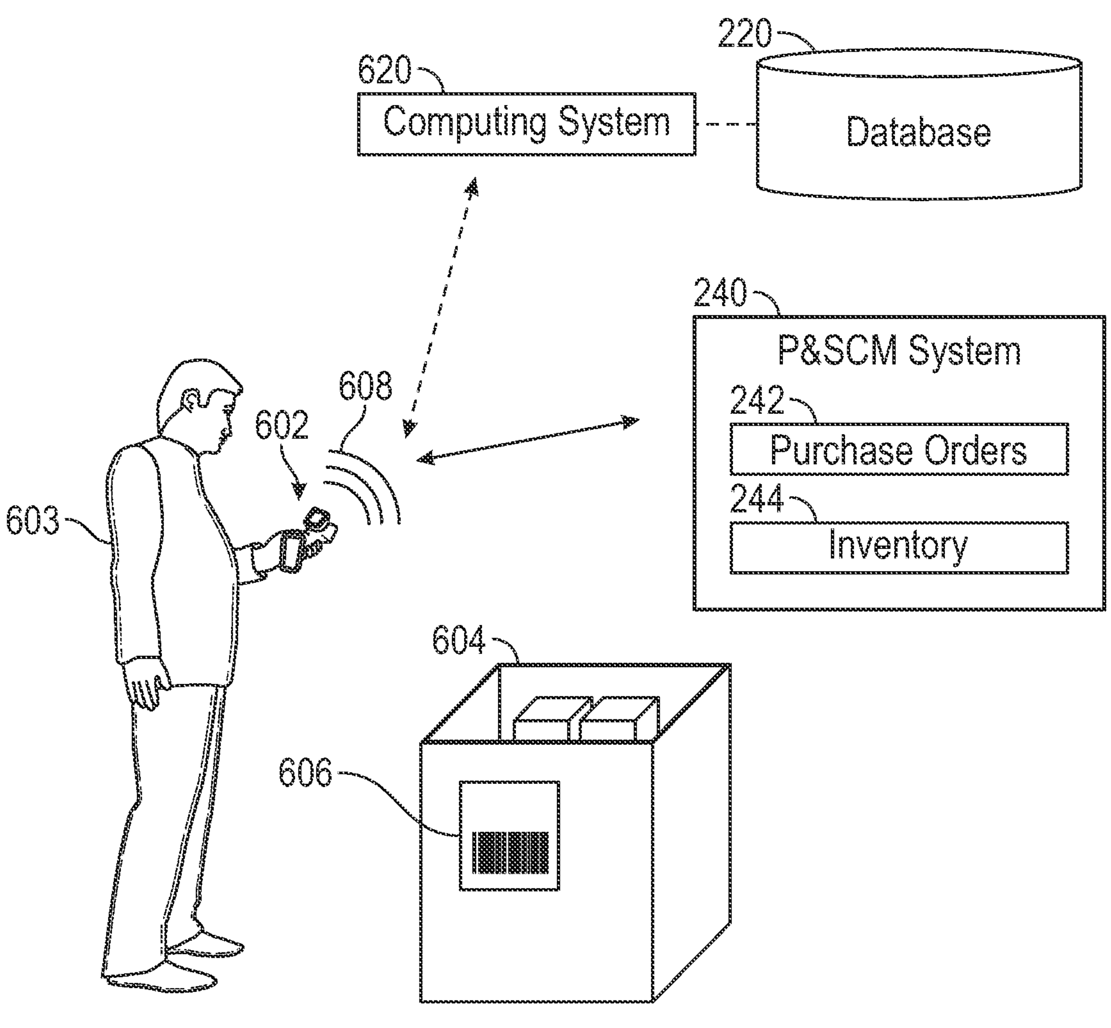
FIG. 6 depicts a handheld device in accordance with one or more embodiments.

In one or more embodiments, the ML-based article checking system (202) may locate and provide a location of damage of an article determined to be damaged. For example, FIG. 5, for clarity, depicts a portion of a damaged article (502). Specifically, the portion of the damaged article (502) depicted in FIG. 5 is a cylinder head of an engine block. As seen in FIG. 5, the shown cylinder head has four valve stems, two of which have complimentary mating surfaces with the cylinder head body and two of which are damaged and do not form a complimentary mating interface with the cylinder head body. The damaged valve stems are bounded by a bounding box (504) to locates, with greater specificity, the location of damage on the depicted article. Thus, in one or more embodiments, the ML-based article checking system may further locate, for example, annotating an image with a damaged area bounding box, the location of damage on a damaged article.

In accordance with one or more embodiments, the ML-based article checking system (202) includes a handheld device (602). The handheld device (602) can include, at least, the camera (204) of the ML-based article checking system (202). The handheld device (602) can be any end terminal device that is portable such as a smartphone, tablet, or scanner (e.g., barcode scanner). As such, the handheld device (602) can be directed, by a user (603), toward a consignment (e.g., Consignment C (604)) including one or more articles with an associated article identifier (e.g., Article Identifier C (606)). In one or more embodiments, the handheld device (602) communicates wirelessly (608) with the P&SCM system (240) and, in some instances, a computing system (620). Wireless communication (608) may be facilitated through RFID, NFC, low-energy Bluetooth, low-energy wireless, low-energy radio protocols, LTE-A, and WiFi-Direct technologies, or other wireless methods, without departing from the scope of this disclosure. In one or more embodiments, the first and second machine-learned models (206, 208), as well as the preprocessor and feature extractor (212) are implemented using computer hardware within the handheld device (602). In other embodiments, the first and second machine-learned models (206, 208) are executed on the computing system (620), where the computing system (620) may be like that depicted and described with reference to FIG. 10, below. In embodiments where the computing system (620) is used, the handled device (602) wirelessly transmits one or more acquired images, acquired using the handheld device (602), to the computing system (620) for processing. The computing system (620), in turn, may transmit a result of the ML-based article checking system (202) to the handheld device (602) upon processing the one or more transmitted images. Further, the computing system (620) can interact with the database (220) to store transmitted images and associated class and damage labels as determined using the first and second machine-learned models (206, 208).

In one or more embodiments, the handheld device (602) has a display. The display can display the result of the ML-based article checking system (202), whether the first and second machine-learned models (206, 208) are implemented on the handheld device (602) itself or using a computing system (620). The display may indicate to the user (603) whether the detected and determined set of classes and quantity of each class matches the expected articles as given by the article identifier. Further, the display may alert the user (603) of damaged articles. In one or more embodiments, the display displays a real-time (or near real-time) image feed of the consignment (and associated articles) in view of the camera (204) of the handheld device (602) and overlays, or annotates, the image feed with information regarding the articles such as bounding boxes, determined article class labels, and the location (e.g., using a bounding box) of damaged articles.

In one or more embodiments, the handheld device (602) is used to transmit command and control signals (e.g., Command Signal Y (250)). In some embodiments, a display of the handheld device (602) provides a user interface and menu to select one or more actions based on the result of the ML-based article checking system (202). For example, upon displaying information that a received consignment is found to be in good order (i.e., determined class and quantity of articles matches the expected articles and no articles are determined to be damaged) the handheld device (602) can further display an option to the user (603), for selection, to generate a goods receipt (e.g., using the goods receipt generator (210)) and to issue a command signal to update the inventory (244). In some embodiments, the handheld device (602) is configured to provide haptic feedback to the user (603), for example, upon determining a detected article is damaged.

Figure 7:
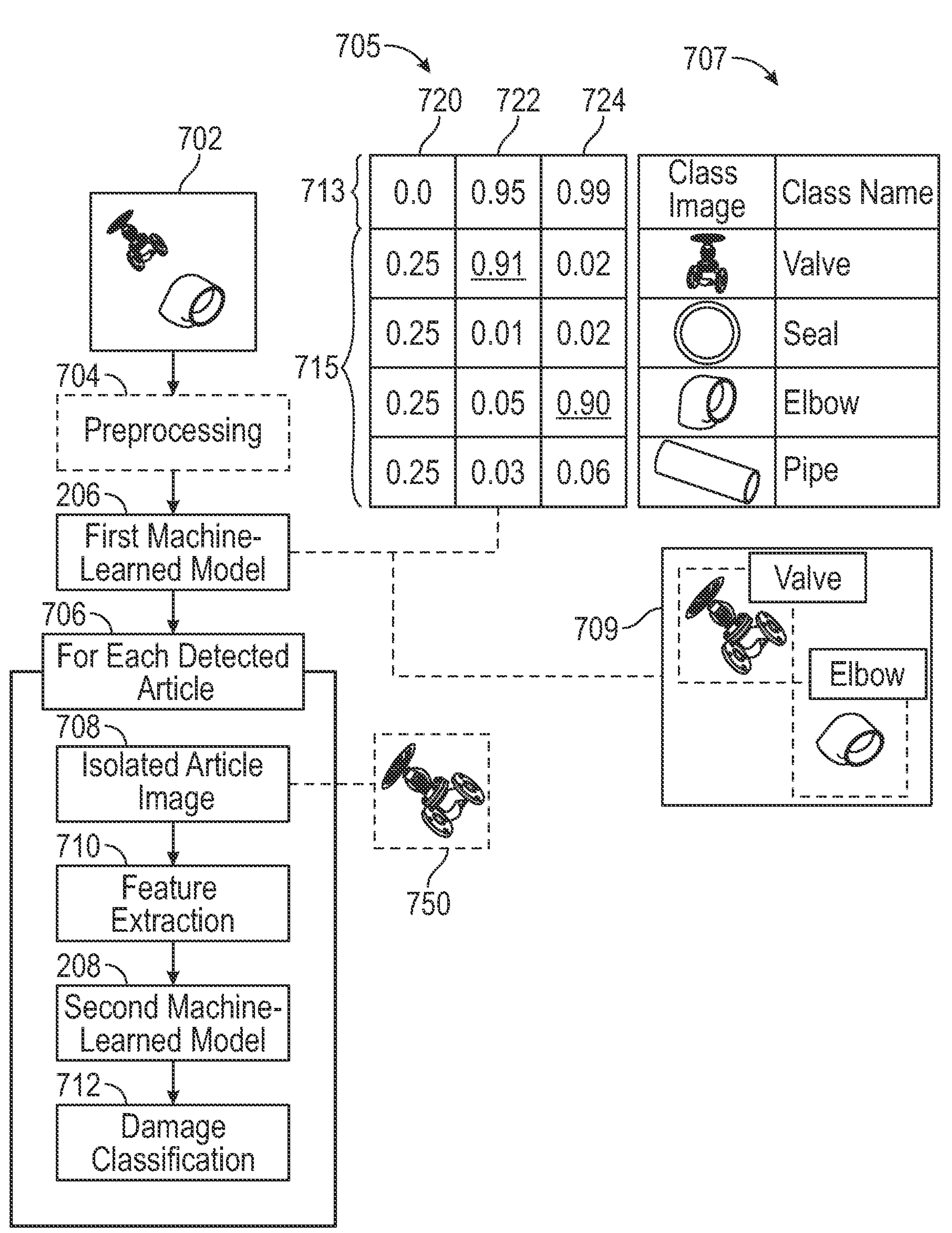
FIG. 7 depicts a system in accordance with one or more embodiments.

FIG. 7 depicts a flowchart demonstrating, at a high-level, how the ML-based article checking system (202) detects an article of a consignment and determines whether the detected article is damaged. FIG. 7 depicts an example consignment image (702) that visually captures two articles in a received consignment. The example consignment image (702) is acquired using the camera (204) of the ML-based article checking system (202) (e.g., using the handheld device (602)). In one or more embodiments, the example consignment image (702) undergoes preprocessing (e.g., using the preprocessor and feature extractor (212)). Preprocessing (704) may include, but is not limited to, grayscale conversion, normalization, and standardization (e.g., down- or up-sampling the example consignment image (702) to a predefined size). One with ordinary skill in the art will recognize that other preprocessing techniques may be applied without departing from the scope of this disclosure. In one or more embodiments, preprocessing (704) is omitted and the example consignment image is passed to the first machine-learned model (206) without alteration.

Continuing with FIG. 7, the example consignment image (702), possibly having undergone one or more preprocessing (704) steps, is processed by the first machine-learned model (206). In one or more embodiments, the first machine-learned model (206) outputs a data structure (705) representing, at least, the classes of the detected articles in the example consignment image (702). For example, in one or more embodiments, the data structure (705) is composed of and structured as a sequence of column vectors, where each column vector corresponds to an anchor box. The first data entry (713) in each column vector corresponds to an "objectness" score representative of the belief of the first machine-learned model (206) that an article resides in the associated anchor box. In one or more embodiments, a predefined objectness threshold is used to filter out anchor boxes not believed to enclose an article. A given column vector may further contain data elements corresponding to a class distribution (715). The class distribution indicates the probability that an article in the anchor box belongs to a given class, where the set of modeled classes (707) is indexed identically to the class distribution. In one or more embodiments, upon determining that a given anchor box encloses an article (e.g., by comparing the objectness score (713) to an objectness threshold) the article is assigned the class from the set of modeled classes (707) with the same index as the highest-valued entry in the class distribution (715). For example, the first column vector (720) depicted in the output data structure (705) of FIG. 7 has an objectness score of 0.0 and is not given further consideration. In contrast, the second column vector (722) has an objectness score of 0.95 that, in the current example, is said to satisfy a given objectness threshold. As such, the class distribution (715) of the second column vector (722) is evaluated to determine that the highest class probability is a value of 0.95 and that this value corresponds, based on aligned indices with the set of modeled classes (707), with the class "valve." As such, the article enclosed by an anchor box associated with the second column vector (722) is classified as a "valve." Similarly, the article enclosed by the anchor box associated with the third column vector (724) is classified as an "elbow." In general, the output data structure (705) may contain additional data entries in each column vector such as the center coordinate and width and height of an associated bounding box. As such, the first-machine learned model (206) may further output, or be used to construct, an annotated version of the example consignment image (702). For example, FIG. 7 depicts an example annotated image (709) that overlays a bounding box and class label over each detected article in the example consignment image (702).

Continuing with FIG. 7, the output of the first machine-learned model (206) is used to construct an isolated article image (e.g., Isolated Article Image (750)) for each article detected in the example consignment image (702). As such, an isolated article image will exist for each detected article (706) and the following processes will apply for each detected article (706). For each detected article (706), in one or more embodiments, its associated isolated article image (708) undergoes a feature extraction (710) process (e.g., using the preprocess and feature extractor (212)) resulting in a featurized representation of the isolated article image (708). The featurized representation may represent features such as, but not limited to, color, shape, texture, and size. In one or more embodiments, the feature representation is constructed by processing the isolated article image with one or more known computer vision techniques such as edge detection. In some embodiments, the isolated article image (708) does not undergo feature extraction (710) and is instead, directly processed by the second machine-learned model (208).

As depicted in FIG. 7, the second machine-learned model (208), whether configured to receive and process a featurized representation of the isolated article image (708) or the isolated article image (708) itself, outputs a damage classification (712) for the article in the isolated article image (708). The damage classification (712) can be binary such as "damaged" or "undamaged," multinomial such as "damaged," "undamaged," or "damage undetermined." In summary, the ML-based article checking system (202) can determine, through processing of an image of a received consignment, the class, quantity, and damage classification of each article of the received consignment and further without the need for an employee to manually check and count the articles of the received consignment and compare with an article identifier (e.g., a delivery note).

Figure 8:
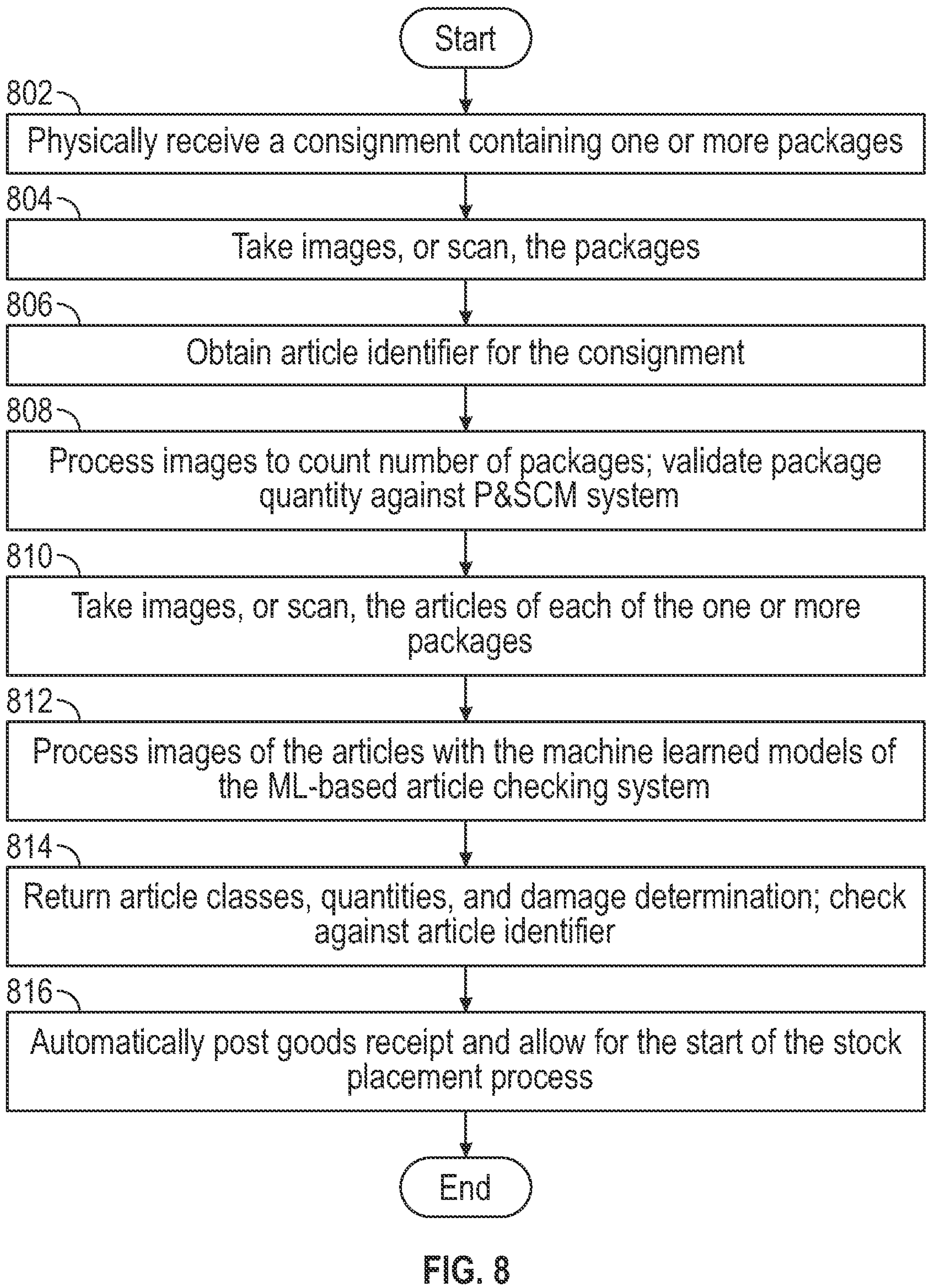
FIG. 8 depicts a flowchart in accordance with one or more embodiments.

FIG. 8 depicts a flowchart outlining the use of the ML-based article checking system (202) in view of a consignment composed of one or more packages, in accordance with one or more embodiments. As depicted, in Block 802, a consignment containing one or more packages is physically received (e.g., at a warehouse of the organization). Articles may be distributed across the one or more packages. Further, in determining the quantity of articles in the consignment, the quantity of packages should also be considered. In Block 804, using the camera (204) of the ML-based article checking system (202), one or more images (or "scans") of the one or more packages of the consignment are acquired. In Block 806 an article identifier for the consignment is obtained. The article identifier may be obtained, for example, from the images of the packages where the article identifier can be depicted visually (or has a visual encoding) such as a delivery note or a barcode. In Block 808, an object detection model (e.g., the first machine-learned model) is applied to the images of the consignment as a whole to identify and count the number of packages in the consignment. The number of packages is validated against an external system such as the P&SCM system. In Block 810, images (or a "scan") of the articles of each of the one or more packages are acquired. In one or more embodiments, the camera (204) of the ML-based article checking system (202) is disposed on a handheld device (602) that is directed at each package in the received consignment by a user to acquire the images of the articles. In Block 812, the images of the articles are processed using, at least, the machine-learned models (206, 208) of the ML-based article checking system (202), as described herein, to detect and classify instances of articles. In Block 814, the ML-based article checking system (202) returns, at least, the determined set of classes and quantity of each class as well as a damage classification for each article. Finally, in Block 816, a goods receipt is posted automatically by the ML-based article checking system (202) to allow for the start of a stock placement process (e.g., accepting and storing the articles in a physical inventory).

Figure 9:
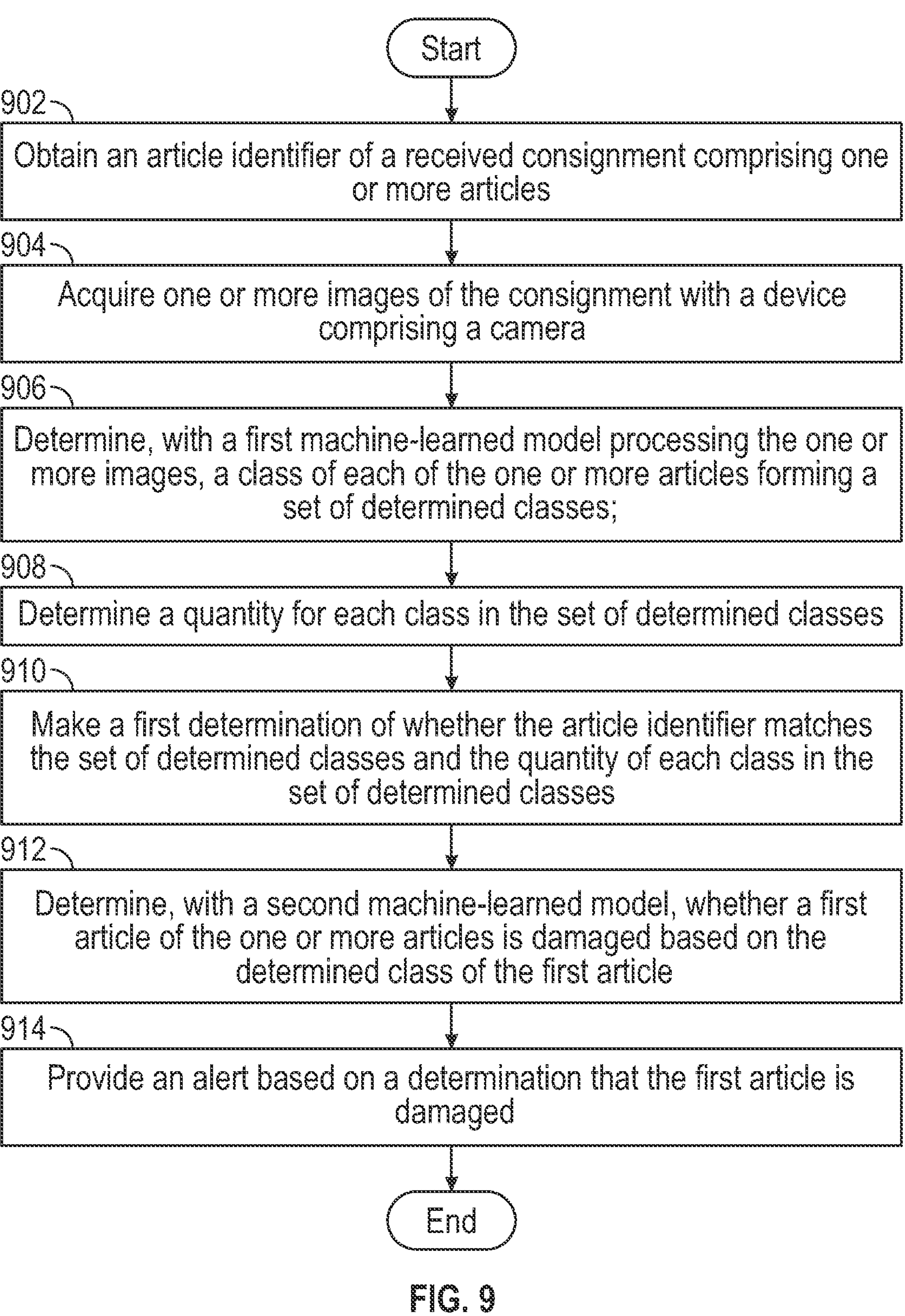
FIG. 9 depicts a flowchart in accordance with one or more embodiments.

FIG. 9 depicts a flowchart outlining a method in accordance with one or more embodiments. In Block 902, are article identifier is obtained for a received consignment, the received consignment containing one or more articles. The article identifier indicates, at least, the expected articles, in terms of class and quantity, in the received consignment. In one or more embodiments, the article identifier is received using a camera (204). For example, the camera (204) may be used with optical character recognition (OCR) methods to read a delivery note or invoice of the consignment. In other embodiments, the article identifier is received by scanning an RFID tag of the received consignment with an RFID reader.

In Block 904, one or more images of the consignment are acquired with a device that includes a camera. In one or more embodiments, the device is a handheld device (602) like that depicted in FIG. 6. In other embodiments, the device may be a camera itself, for example, a camera installed in a warehouse. In Block 906, the one or more images are processed with a first machine-learned model (206) to determine a class of each of the one or more articles forming a set of determined classes. The first machine-learned model further detects each instance of an article. As such, with each instance of an article detected assigned a class, in Block 908, a quantity of each class in the set of determined classes is determined. In Block 910, a determination is made whether the article identifier matches the set of determined classes and the determined quantity of each class in the set of determined classes. That is, the article identifier, which indicates, at least, an expected set of classes and an expected quantity of each class is checked against the set of determined classes and determined quantities. Checking ensures that the expected quantity of a given expected class of article is equal to the quantity of the class of article actually present in the received consignment as determined, automatically, in Blocks 906 and 908.

In Block 912, a second machine-learned model (208) is used to determine whether each article of the one or more articles is damaged. For example, considering the case of a single article, namely a first article, the second machine-learned model (208) receive as an input a representation of the first article as well as the determined class of the first article to determine whether the first article is damaged. In one or more embodiments, the representation of the first article is an isolated article image of the first article. In other embodiments, the representation of the first article is a featurized representation of the isolated image article of the first article. The second machine-learned model (208) returns a damage classification for the first article. Finally, in Block 914, an alert is provided based on a determination that the first article is damaged. The alert may be provided through a display of a handheld device (602) or realized on one or more external systems (e.g., through an email or SMS message to a responsible owner or receiver of the consignment).

Embodiments of the instant disclosure provide one or more of the following advantages. The ML-based article checking system (202), as described herein, enables the automatic and autonomous checking of a received consignment against an expected order (e.g., delivery note, invoice, etc.). Use of the ML-based article checking system (202) does not require a manual and laborious article checking process to be performed by an employee thus eliminating human errors in terms of, at least, counting and matching physical materials (i.e., articles) with an accompanying written description (e.g., article identifier). The ML-based article checking system (202) further determines whether articles are damaged without relying on specialized knowledge of an employee to know possible damage modes of an article (because some articles may be unknown to a general employee) and manual inspection of each article. Further, the ML-based article checking system (202) can automatically generate a goods receipt tailored to the determinations of the ML-based article checking system (e.g., initiating a stock placement process if a consignment is deemed to be in good order or canceling the receipt of an article if determined to be damaged).

Figure 10:
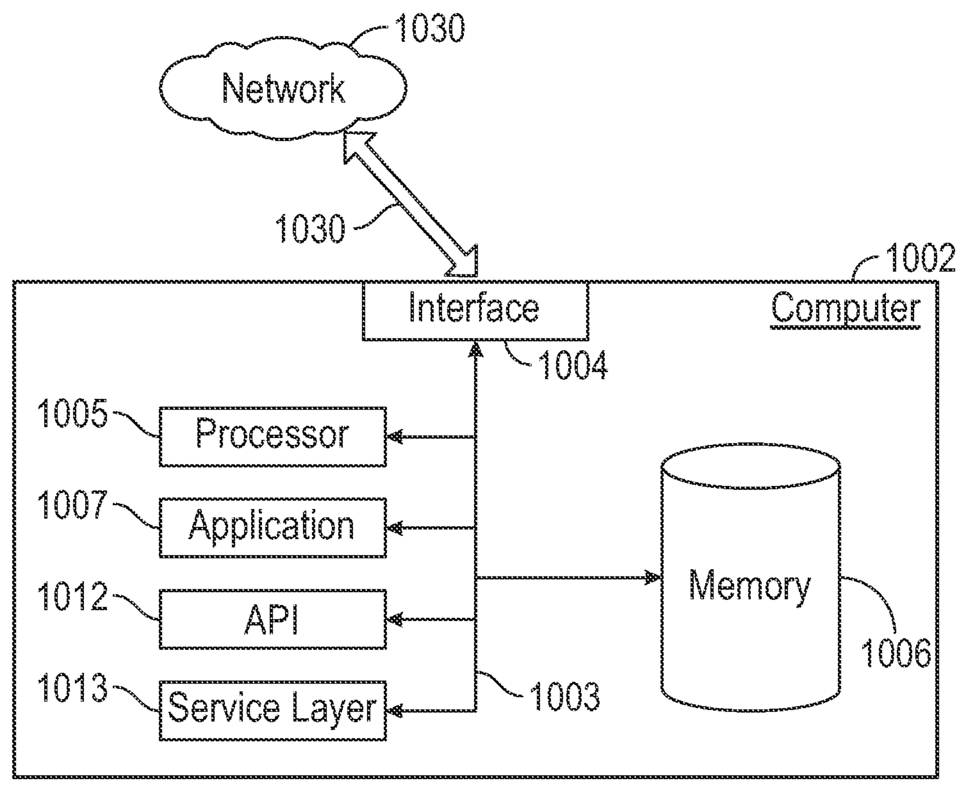
FIG. 10 depicts a system in accordance with one or more embodiments.

FIG. 10 depicts a block diagram of a computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). The memory may be a non-transitory computer readable medium. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:

acquiring, with a handheld device comprising a camera, at least one image of a received consignment comprising one or more articles;

obtaining an article identifier for the received consignment based on the at least one image;

determining, with a first machine-learned model processing the at least one image, a class of each of the one or more articles forming a set of determined classes and a quantity for each class in the set of determined classes;

making a first determination whether the article identifier matches the set of determined classes and the quantity of each class in the set of determined classes;

generating, from the at least one image having been processed with the first machine-learned model, an isolated article image for each of the one or more articles;

determining, with a second machine-learned model processing a first isolated image corresponding to a first article comprised by the one or more articles, whether the first article is damaged based on the determined class of the first article; and generating an alert based on a determination that the first article is damaged.

2. The method of claim 1, wherein the article identifier comprises an expected set of classes and an expected quantity for each class in the expected set of classes.

3. The method of claim 1, wherein the article identifier is obtained by reading a barcode of a delivery note attached to the received consignment from the at least one image.

4. The method of claim 1, wherein the at least one image depicts a label associated with the received consignment and the article identifier is obtained by processing the label.

5. The method of claim 1, further comprising:

determining a first set of features for the first article, wherein the second machine-learned model determines whether the first article is damaged based on the first set of features.

6. The method of claim 1, further comprising wirelessly transmitting the at least one image from the handheld device to a computing system configured to execute the first machine-learned model and the second machine-learned model.

7. The method of claim 1, wherein the first machine-learned model is a convolutional neural network.

8. The method of claim 1, further comprising:

generating and transmitting a goods receipt to a procurement and supply chain management system.

9. A non-transitory computer-readable memory comprising computer-executable instructions stored thereon that, when executed on a processor, cause the processor to perform steps comprising:

receiving, from a handheld device comprising a camera, at least one image of a received consignment comprising one or more articles;

obtaining an article identifier for the received consignment based on the at least one image;

determining, with a first machine-learned model processing the at least one image, a class of each of the one or more articles forming a set of determined classes and a quantity for each class in the set of determined classes;

making a first determination whether the article identifier matches the set of determined classes and the quantity of each class in the set of determined classes;

generating, from the at least one image having been processed with the first machine-learned model, an isolated article image for each of the one or more articles;

determining, with a second machine-learned model processing a first isolated image corresponding to a first article comprised by the one or more articles, whether the first article is damaged based on the determined class of the first article; and generating an alert based on a determination that the first article is damaged.

10. The non-transitory computer-readable memory of claim 9, wherein the article identifier comprises an expected set of classes and an expected quantity for each class in the expected set of classes.

11. The non-transitory computer-readable memory of claim 9, wherein the article identifier is obtained by reading a barcode of a delivery note attached to the received consignment from the at least one image.

12. The non-transitory computer-readable memory of claim 9, wherein the at least one image depicts a label associated with the received consignment and the article identifier is obtained by processing the label.

13. The non-transitory computer-readable memory of claim 9, the steps further comprising:

determining a first set of features for the first article, wherein the second machine-learned model determines whether the first article is damaged based on the first set of features.

14. The non-transitory computer-readable memory of claim 9, wherein the at least one image is received via wireless transmission from the handheld device.

15. The non-transitory computer-readable memory of claim 9, wherein the first machine-learned model is a convolutional neural network.

16. The non-transitory computer-readable memory of claim 9, the steps further comprising:

generating and transmitting a goods receipt to a procurement and supply chain management system.

17. A system, comprising:

a warehouse that receives a consignment comprising one or more articles;

a handheld device comprising a camera; and a computer comprising one or more computer processors, the computer configured to:

receive, from the handheld device comprising, at least one image of the received consignment;

obtain an article identifier for the received consignment based on the at least one image;

determine, with a first machine-learned model processing the at least one image, a class of each of the one or more articles forming a set of determined classes and a quantity for each class in the set of determined classes;

make a first determination whether the article identifier matches the set of determined classes and the quantity of each class in the set of determined classes;

generate, from the at least one image having been processed with the first machine-learned model, an isolated article image for each of the one or more articles;

determine, with a second machine-learned model processing a first isolated image corresponding to a first article comprised by the one or more articles, whether the first article is damaged based on the determined class of the first article; and generate an alert based on a determination that the first article is damaged.

18. The system of claim 17, the computer further configured to:

generate and transmit a goods receipt to a procurement and supply chain management system.

19. The system of claim 17, wherein the article identifier comprises an expected set of classes and an expected quantity for each class in the expected set of classes.

20. The system of claim 17, wherein the article identifier is obtained by reading a barcode of a delivery note attached to the received consignment from the at least one image.

* * * * *